United States Patent [19]

Tschan et al.

[11] Patent Number: 4,778,845

[45] Date of Patent: Oct. 18, 1988

[54] ONE-PART ADHESIVE AND/OR SEALING MASS WHICH IS STABLE AND PUMPABLE AT TEMPERATURES UP TO 30 DEGREE C.

[75] Inventors: Hans-Peter Tschan, Oberglatt; Lutz-Dieter Zabel, Birmensdorf; Ueli Pfenninger, Au, all of Switzerland

[73] Assignee: Sika AG, vorm. Kaspar Winkler & Co., Zurich, Switzerland

[21] Appl. No.: 58,277

[22] Filed: Jun. 4, 1987

[30] Foreign Application Priority Data

Aug. 4, 1986 [CH] Switzerland ............... 3124/86

[51] Int. Cl.$^4$ ............................................. C08G 18/30
[52] U.S. Cl. ..................... 524/710; 524/723; 524/730; 524/742; 524/745; 524/728; 524/773; 524/775; 524/786; 524/788; 524/789; 524/792; 524/127; 525/127; 528/54; 528/55; 528/58; 528/59; 528/61; 528/63; 528/64; 528/905
[58] Field of Search ............... 524/710, 723, 730, 742, 525/127; 528/54; 528/55; 528/58; 528/59; 528/61; 528/63; 528/64; 528/905

[56] References Cited

U.S. PATENT DOCUMENTS

| | | | |
|---|---|---|---|
| 3,114,734 | 12/1963 | Gobrau et al. | 260/75 |
| 3,228,914 | 1/1966 | Saint-Frison et al. | 260/75 |
| 3,707,521 | 12/1972 | De Santis | 260/37 |
| 3,931,077 | 1/1976 | Uchigaki et al. | 260/26 |
| 3,933,725 | 1/1976 | Dearlove et al. | 260/33.6 |
| 4,101,530 | 7/1978 | Burkhardt et al. | 528/45 |
| 4,185,718 | 1/1980 | Cawthra et al. | 156/258 |
| 4,193,832 | 3/1980 | Reischl et al. | 156/331 |
| 4,247,676 | 1/1981 | Kimball | 528/49 |
| 4,284,751 | 8/1981 | Hutt et al. | 528/55 |
| 4,313,876 | 2/1982 | Gras et al. | 260/239.3 |
| 4,330,454 | 5/1982 | Kimball | 524/774 |
| 4,412,033 | 10/1983 | LaBelle et al. | 528/55 |
| 4,435,558 | 3/1984 | Burba et al. | 528/121 |
| 4,504,647 | 3/1985 | Zabel et al. | 528/68 |
| 4,585,819 | 4/1986 | Reischle et al. | 524/196 |
| 4,624,996 | 11/1986 | Rizk et al. | 525/424 |
| 4,672,100 | 6/1987 | Schonbachler et al. | 528/75 |

FOREIGN PATENT DOCUMENTS

| | | |
|---|---|---|
| 0153456 | 9/1985 | European Pat. Off. . |
| 2401320 | 7/1974 | Fed. Rep. of Germany . |
| 2542500 | 4/1977 | Fed. Rep. of Germany . |
| 2550156 | 5/1977 | Fed. Rep. of Germany . |
| 2929224 | 2/1981 | Fed. Rep. of Germany . |
| 2946085 | 5/1981 | Fed. Rep. of Germany . |
| 3019356 | 11/1981 | Fed. Rep. of Germany . |
| 3236313 | 4/1984 | Fed. Rep. of Germany . |
| 1539777 | 9/1975 | United Kingdom . |

*Primary Examiner*—John Kight
*Assistant Examiner*—S. A. Acquah
*Attorney, Agent, or Firm*—Burns, Doane, Swecker & Mathis

[57] ABSTRACT

A one-component adhesive and/or sealing mass which is stable and pumpable at temperatures up to 30° C. contains at least one prepolymer on the basis of a polyurethane, which contains from 0.1 to 15 percent by weight, referred to the prepolymer, of free, reactive isocyanate groups, and at least one with heat activatable hardener.

Thereby the stoichiometric ratio between said prepolymer and said hardener is chosen in such a way that only a partial cross-linkage is possible during heating said mass to temperatures from 60° C. to 180° C., and that a product is obtained having from high viscous to plastic characteristics.

The inventive masses may be used for bonding and/or sealing of one or more materials of the same or different origin to a composite.

20 Claims, No Drawings

ONE-PART ADHESIVE AND/OR SEALING MASS WHICH IS STABLE AND PUMPABLE AT TEMPERATURES UP TO 30 DEGREE C.

BACKGROUND OF THE INVENTION

1. Field of the Invention

The present invention is directed to a onecomponent adhesive and/or sealing mass which is stable and pumpable at temperatures up to 30° C., to a process for preparing this mass, as well as to the use of this mass for bonding and/or sealing one or more materials of the same or different origin to a composite.

Polyurethane adhesives are known as one-part systems, hardenable with moisture or with heat, as two-part systems or as hot-melt adhesives (hot melts).

2. Description of the Prior Art

In the U.S. Pat. Nos. 3,933,725 and 3,707,521 there are described the preparation of hardenable polyurethanes by reacting diphenylmethanediisocyanate with polyoxypropylenediols and polyoxpropylenetriols in one-step or two-step processes.

The products obtained in this way may be processed to a moisture hardenable one-component adhesive mass either directly or, as described in the German Offenlegungsschrift No. 30 19 356, by the addition of latent hardeners, e.g. aldimines or oxazolidines. As described in the German Offenlegungsschriften Nos. 29 46 085, 25 42 500, 25 50 156 and 29 29 224 there are obtained in the heat hardenable one-part systems by reacting with blocking agents for isocyanate groups, e.g. phenols, caprolactames, ketoximes and malonic esters.

In case of two-component systems the above described masses are not hardened by means of moisture, but by means of mixing them with a second component, containing a hardener (e.g. diamine, diol or amino alcohol).

Such systems are described in the U.S. Pat. Nos. 3,228,914 and 3,114,734 as well as in the European Pat. No. 0 153 456.

One-part systems are very easily handable, because no mixing process is necessary before the application.

In case of two-part systems the two components must usually be present in an exact stoichiometric mixing ratio, and a good mixing must be guaranteed. The drawback of a moisture hardenable mass consists therein that a hardening takes place relative slowly from the outer layers to the inner layers, and thereby the part to be bonded must sometimes be fixed during a longer time. In the case of two-part adhesive masses the hardening takes place in the whole mass at the same time. A high stability immediately after the application, corresponding to one object of this invention, is also not obtained.

The blocked systems have the disadvantage that the bonded arrangement must be heated to a temperature from 80° C. to 200° C. in order to obtain a hardening of the adhesive mass. This heating step of the parts having sometimes large surfaces may not always be realized, especially in series production in the industry.

A further group of polyurethane adhesive masses are the hot-melt adhesives (hot melts).

They are composed of thermoplastic materials, which are heated for the processing to a temperature of 90° C. to 200° C. and are applied as liquid mass. During cooling the mass solidifies again and forms quickly a rigid bonding.

One differs between nonreactive and reactive hot-melt adhesives.

The nonreactive hot-melts have the disadvantage, due to their thermoplastic behavior, that their mechanical charactertistics are strongly dependent on the temperature. At an elevated temperature they soften again, and at lower temperatures they tend to a development of brittleness, and that is why they may only be used in a narrow temperature range.

The reactive hot-melts are characterized in that the mass contains free reactive isocyanate groups, which after the application allow together with moisture a cross-linkage, and whereby an elastic mass is produced, which is no longer meltable.

The preparation and the composition of such reactive hot-melt adhesives is described in DE-PS No. 24 01 320 and DE-OS No. 32 36 313.

These reactive hot-melt adhesives are during coating only limited non-sag, so that with coatings having a thickness of more than 2 mm the still hot mass flows away. Therefore, their use is limited to certain applications. For example, a bonding of a window in automotive vehicles is not practicable with these adhesives.

A further drawback is the melting of the mass prior to the application. The solid product, usually supplied in drums or cans containing 20 to 30 liters, must be, before it may be pumped and applied, heated from the top with a heatable plate and must directly be pumped through heatable hoses. The heating capacity of the plate, i.e. how much adhesive is molten during a time unit, determines the maximum amount of transport. Due to thermical decomposition the material may not be overheated. The maximum amounts of transport of good, optimally adjusted pumping plants amount to 800 g to 1000 g/min. from a drum (200 liters) and 400 to 500 g/min. from a can containing 20 to 30 liters.

SUMMARY OF THE INVENTION

Hence, it is a general object of this invention to overcome the above mentioned drawbacks. A new one-part adhesive and/or sealing mass shall be provided, which is cheap, easy to prepare and easy to use. The inventive mass shall be storage-stable and pumpable at temperatures up to 30° C. This mass shall also fix the materials of the same or different origin to be bonded and/or to be sealed within a very short time, e.g. within two minutes after the application. The new mass shall also be non-sag during the application in a warm condition. Also the hardening or the complete cross-linkage shall result in a very short time. The bonded and/or sealed parts shall be completely chargeable after 1 to 24 hours.

Quite surprisingly it was found that it is possible with the inventive masses to combine the above mentioned advantages of known one-part adhesive masses with the above mentioned advantages of known reactive hot-melt adhesives.

The inventive one-part adhesive and/or sealing mass, which is stable and pumpable at temperatures up to 30° C., is characterized in that it contains at least one prepolymer on the basis of a polyurethane, containing from 0.1 to 15 percent by weight, referred to the prepolymer, of free reactive isocyanate groups, and at least one hardener, activatable with heat, whereby the stoichiometric ratio between said prepolymer and said hardener is chosen in such a way that during heating of said mass to temperatures from 60° C. to 180° C. only a partial cross-linkage is possible, and that a product is obtained, having from high viscous to plastic characteristics.

Preferred embodiments of the inventive mass are defined in the dependent product claims.

In the inventive masses the stoichiometric ratio between prepolymer and hardener as well as their choice is such that the two mentioned components do not react with each other at temperatures up to 30° C., especially at room temperature, but that at elevated temperatures in the range from 60° C. to 180° C. a partial cross-linkage is rendered possible. By this partial cross-linkage a product is obtained, which has at room temperature, depending on the degree of cross-linkage, from high viscous to plastic characteristics. By the following influence of water, preferably water steam, e.g. moisture, the complete cross-linkage is realized.

By this complete cross-linkage a product is obtained, which has elastic characteristics.

With the partial cross-linkage, obtained by the influence of heat, a mass, which is at the beginning pumpable and transportable at room temperature, is transformed into a product having thermoplastic characteristics. This product, cooled to room temperature, is no longer pumpable or transportable. At an elevated temperature, preferably in the range from 90° C. to 110° C., this product is transportable, and preferably also non-sag. In heated form it is directly applicable. In this form the mass is an in situ prepared reactive hot-melt adhesive. Thereby the necessity of melting with known reactive hot-melt adhesives is no longer necessary. This results in a reduction in costs, a simplification of the application process and an increase of the quantity delivered per time unit.

By the choice of the prepolymer or of the prepolymer-mixture and/or of the hardener or of the hardener-mixture the characteristics of the partial cross-linked as well as of the completely cross-linked product may be defined. By the use of plasticizers, thixotropic agents, fillers, adjuvants and additives the characteristics of the partial cross-linked as well as of the completely cross-linked product also may be influenced.

With two, at different temperatures activatable, hardeners it is possible to obtain a completely cross-linked mass by the influence of heat only. With a hardener activatable at lower temperatures, e.g. from 60° C. to 100° C., there is obtained the above mentioned partial cross-linkage, and with a hardener, activatable at higher temperatures, e.g. from 130° C. to 200° C., there is obtained the above mentioned complete cross-linkage.

There also exists the possibility that with a suitable choice of hardeners and their amounts complete cross-linkage may be obtained by a combination of the influence of water, preferably of water steam, e.g. moisture, and by the application of heat, e.g. temperatures from 130° C. to 200° C.

The inventive masses are as mentioned above stable during storage, e.g. during 9 to 12 months at a temperature from 20° C. to 30° C.

Of course the masses according to this invention must be kept under exclusion of moisture.

The hardeners—also named cross-linking agents—used in the inventive masses are activatable preferably at temperatures above about 50° C.

According to a preferred embodiment of this invention the hardener activatable by heat and having at least two of the same or different hydrogen containing functional groups is reacted only after the application of heat by means of activating, liberation, melting or dissolving. Especially suitable are hardeners which after the application of heat, transform into their reactable form and react with the free isocyanate groups of the prepolymer very quickly. Examples are:

dicyandiamide or the sodium chloride complex salt of 4,4'-diaminodiphenylmethane.

Especially the following advantage may be obtained with the inventive masses: at a complete or partial breakdown of the heating in a processing plant the inventive masses may harden completely by the influence of water, preferably water vapor, e.g. moisture.

The inventive masses are preferably used in large industrial plants, e.g. production lines. Thereby the inventive masses are pumped from a storage container at room temperature and with the exclusion of moisture with known one-component pump systems, e.g. with a pump of the series 700 of the firm Kent-Moore, then transported through a heatable hose, wherein the partial cross-linkage takes place, and then applied in a hot state on the materials to be bonded and/or to be sealed.

A preferred application for masses according to this invention is mounting and/or the bonding of windows of automotive vehicles.

The inventive process for the preparation of the inventive one-part adhesive and/or sealing masses is characterized in that under water-free conditions at least one prepolymer on the basis of a polyurethane, containing from 0.1 to 15 percent by weight, referred to the prepolymer, of free reactive isocyanate groups, is placed before and mixed homogeneously at temperatures up to a maximum of 40° C. with at least one hardener, activatable with heat, whereby the stoichiometric ratio between said prepolymer and said hardener is chosen in such a way that during heating of said mass to temperatures from 60° C. to 180° C. only a partial cross-linkage is possible, and that a product is obtained having from high viscous to plastic characteristics.

Preferred embodiments of the inventive process are defined in the dependent process claims.

The inventive one-part adhesive and/or sealing masses may be used for bonding and/or sealing of one or more materials of the same or different origin to a composite.

Preferred uses of the inventive masses are defined in the dependent use claims.

The following examples shall illustrate the invention.

EXAMPLE 1

(a) Prepolymer: To a mixture of 2500 g of a polyethertriol having an average molecular weight of 4700, 2900 g of a polyetherdiol having an average molecular weight of 2000, and 1800 g diisooctylphthalate there was added successively, while stirring 50 g of a 5 percent 1,4-Diazobicyclo[2.2.2.]octane (DABCO) in diisooctylphthalate solution and 630 g of 2,4-toluenediisocyanate. The reaction mixture is stirred at a temperature of 80° C. up to the moment where the free isocyanate content remains constant at about 1.1 percent by weight.

(b) Prepolymer/hardener-mixture: 1000 g of the above described prepolymer are mixed under vacuum homogeneously at a temperature of 20° C. with 18 g of the sodium chloride complex salt of 4,4'-diaminodiphenylmethane 50% in DOP (Caytur 21 trademark of Uniroyal Chemical).

When this good pourable, at a temperature of 25° C. storage stable mass, having a viscosity of about 15 Pa.s, is heated to a temperature of 100° C., one obtains a mass which is at a temperature of 100° C. highly viscous and at a temperature of 20° C. originally tacky and plastic, but which reacts with moisture to a dry elastic product.

EXAMPLE 2

3700 g of the prepolymer prepared according to Example 1 are mixed under vacuum homogeneously in a suitable mixer or kneader with 700 g of dried carbon black, 600 g of dried kaoline, 30 g of a silane containing compound and with 4 g of a dibutyltindilaurate solution. Then the mixture if cooled to a temperature of 20° C. At 20° C. are added homogeneously 66 g Caytur 21. One obtains a good workable, not flowable, at a temperature of 25° C. storage stable and pumpable mass. When this mass is pumped through a heated hose (e.g. 6 m long and having a diameter of 10 mm) in such a way that the outlet temperature is 90° C. to 100° C., one obtains a still good workable, non-sag, tacky mass, which, after cooling, is touchable and plasticly formable. With moisture this mass hardens to an adhesive and sealing mass having a good elasticity, a high tensile strength ($>6N/mm^2$) and good adhesion characteristics on glass and diverse metals. Tensile-/shear-tests on glass and aluminium gave a 100% cohesive rupture.

While there are shown and described present preferred embodiments of the invention, it is to be distinctly understood that the invention is not limited thereto, but may be otherwise variously embodied and practiced within the scope of the following claims.

We claim:

1. One-part adhesive and/or sealing mass, which is storage stable and pumpable at temperatures up to 30° C., characterized in that it contains
   at least one prepolymer on the basis of a polyurethane, containing from 0.1 to 15 percent by weight, referred to the prepolymer, of free reactive isocyanate groups, and
   at least one hardener, activatable with heat,
   whereby the stoichiometric ratio between said prepolymer and said hardener is such that during heating of said mass to temperatures from 60° C. to 180° C. only partial cross-linkage is possible yielding a product having high viscous to plastic characteristics.

2. Mass according to claim 1, characterized in that the stoichiometric ratio between said prepolymer and said hardener is from 20:1 to 100:95.

3. Mass according to claim 1, characterized in that the prepolymer is present in an amount from 10 to 95 percent by weight referred to the total weight of the mass.

4. Mass according to claim 1, additionally comprising at least one of;
   at least one plasticizer,
   at least one thixotropic agent,
   at least one filler, or
   at least one adjuvant or additive.

5. Mass according to claim 4, characterized in that
   the plasticizer is selected from the group consisting of phthalates, such as dibutyl-, dioctyl-, dicyclohexyl-, diisooctyl-, diisodecyl-, dibenzyl- or butylbenzylphthalate, phosphates, such as trioctylphosphate or diphenyloctylphosphate, adipates, such as dioctyladipate or benzyloctyladipate, sulfonic acid esters, sulfoneamides, chloroparaffines and polybutenes,
   the thixotropic agent is selected from the group consisting of acrylate derivatives, urea derivatives, silicic acid derivatives, precipitated chalks, PVC, carbon black and
   the filler is selected from the group consisting of chalks, kaolinites, metal powders and talcum,
   the adjuvant or additive is selected from
      (a) adhesion promoters, especially silane containing compounds, which may additionally contain at least one reactive group, such as amine, epoxy, isocyanate and mercapto groups,
      (b) usual polyurethane catalysts, such as lead and/or tin compounds and/or tertiary amines,
      (c) latent hardeners, such as aldimines, ketimines and oxazolidines,
      (d) dyes or pigments,
      (e) UV-absorbtion agents and/or stabilizers, such as antioxidants and screening agents,
      (f) surface active additives,
      (g) flame retardants, and
      (h) fungistatic and/or bacteriostatic active substances.

6. Mass according to claim 1 where the prepolymer is formed from the following components;
   (a) aromatic diisocyanates, such as 4,4'-diphenylmethanediisocyanate, 2,4-toluene-diisocyanate, naphthylene-1,5-diisocyanate, 1,3- and 1,4-phenylenediisocyanate, triphenylmethane-4,4',4"-triisocyanate, polyphenyl-polymethylenepolyisocyanates, and/or
   (b) aliphatic or cycloaliphatic diisocyanates, such as hexamethylene-diisocyanate, 1,12-dodecanediisocyanate, cyclobutane-1,3-diisocyanate, cyclohexane-1,3- and -1,4-diisocyanate, 1-isocyanato-3,3,5-trimethyl-5-isocyanate-methylcyclohexane, 2,4- and 2,6-hexahydrotolyene-diisocyanate, hexahydro-1,3- and -1,4-phenyldiisocyanate, perhydro-2,4'- and -4,4'-diphenylmethane-diisocyanate, and
   (c) polyols having a molecular weight range from 400 to 10 000, preferably from 1000 to 6000, such as linear or branched polyacrylates, polybutadienes, polycarbonates, polycaprolactones, polycaprolactams, polyethers, polyesters, polymethacrylates, polythioethers, polyurethanes, each having at least two terminal primary and/or secondary OH-groups.

7. Mass according to claim 1, characterized in that the hardener activatable with heat has at least two of the same or different hydrogen containing functionable groups, which are reactable with the free reactive isocyanate groups of the prepolymer at temperatures above from 50° C.

8. Mass according to claim 7, characterized in that the hardener is dicyandiamide or the sodium chloride complex salt of 4,4'-diaminodiphenylmethane.

9. A process for the preparation of the one-part adhesive and/or sealing masses according to claim 1, characterized in that under water-free conditions at least one prepolymer on the basis of a polyurethane, containing from 0.1 to 15 percent by weight, referred to the prepolymer, of free reactive isocyanate groups, is supplied and mixed homogeneously, at temperatures up to a maximum of 40° C., with at least one hardener, activatable with heat, whereby the stoichiometric ratio between said prepolymer and said hardener is such that during heating of said mass to temperatures from 60° C. to 180° C. only partial cross-linkage is possible, and yielding a product having high viscous to plastic characteristics.

10. The process according to claim 9, characterized in that said prepolymer is provided, then mixed homogeneously with at least one component selected from at least one plasticizer, and/or at least one thixotropic agent, at least one filler, and at least one adjuvant or additive, and then is mixed homogeneously at temperatures up to 40° C. with at least one hardener, activatable with heat, whereby the stoichiometric ratio between said prepolymer and said hardener is chosen in such a way that during heating of said mass to temperatures from 60° C. to 180° C. only partial cross-linkage is possible, and yields a product having high viscous to plastic characteristics.

11. The process according to claim 9, characterized in that a mass is prepared which is storage stable and pumpable at temperatures up to 30° C., said mass being characterized in that it contains at least one prepolymer on the basis of a polyurethane, containing from 0.1 to 15 percent by weight, referred to the prepolymer, of free reactive isocyanate groups, and at least one hardener, activatable with heat, whereby the stoichiometric ratio between said prepolymer and said hardener is from 20:1 to 100:95, preferably from 10:1 to 2:1 and is chosen in such a way that during heating of said mass to temperatures from 60° C. to 180° C. only a partial cross-linkage is possible, and that a product is obtained having from high viscous to plastic characteristics.

12. Use of the one-component adhesive and/or sealing masses according to claim 1 for bonding and/or sealing of one or more materials of the same or different origin to a composite.

13. Use according to claim 12, characterized in that the materials to be bonded and/or to be sealed are selected from the group consisting of any glass, especially glass plates for use in automotive vehicles, composite glass plates, front walls of glass, any metal, which may be varnished, metallized or otherwise coated and/or preheated, any metal alloy, which may be varnished, metallized or otherwise coated and/or pretreated, any plastic, any construction material, especially stones, concrete, mortar, road pavings, and any wood.

14. Use according to claim 12, characterized in that the adhesive and/or sealing mass is heated for a partial cross-linkage before the application to a temperature from 60° C. to 180° C., preferably from 80° C. to 150° C., especially from 90° C. to 110° C., until the mass has high viscous to plastic characteristics, measured at room temperature, and is then applied to the materials to be bonded and/or to be sealed in said temperature range, and is then hardened completely by the influence of either water, vapor, or by the influence of heat.

15. The mass according to claim 2 wherein said stoichiometric ratio is from 10:1 to 2:1.

16. The mass according to claim 3 wherein said prepolymer is present in an amount from 4 to 40 percent by weight referred to the total weight of the mass.

17. The mass according to claim 4 wherein said at least one plasticizer is present in an amount from 3 to 30 percent by weight, said at least one thixotropic agent is present in an amount from 3 to 30 percent by weight, said at least one filler is present in an amount ranging from 3 to 50 percent by weight and said at least one adjuvant or additive is present in an amount from 0.01 to 7 percent by weight referred to the total mass.

18. The mass according to claim 4 wherein said at least one plasticizer is present in an amount from 10 to 20 percent by weight, said at least one thixotropic agent is present in an amount from 10 to 20 percent by weight, said at least one filler is present in an amount ranging from 10 to 20 percent by weight and said at least one adjuvant or additive is present in an amount from 0.01 to 7 percent by weight referred to the total mass.

19. The use according to claim 14 wherein said partial cross linkage is from 80° C. to 150° C.

20. The use according to claim 19 wherein said partial cross linkage is from 90° C. to 110° C. and said heat hardener is from 130° C. to 200° C. or said water hardening agent is water vapor.

* * * * *